United States Patent
Ogasawara et al.

(10) Patent No.: US 9,758,355 B2
(45) Date of Patent: Sep. 12, 2017

(54) BRAKE DEVICE AND CRANE WITH BRAKE DEVICE

(71) Applicant: MITSUI ENGINEERING & SHIPBUILDING CO., LTD., Tokyo (JP)

(72) Inventors: Masanobu Ogasawara, Oita (JP); Masato Horie, Oita (JP); Yohei Suzuki, Oita (JP); Syuntaro Iseki, Oita (JP); Tatsuya Abe, Oita (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 0 days.

(21) Appl. No.: 14/780,325

(22) PCT Filed: Mar. 27, 2014

(86) PCT No.: PCT/JP2014/058994
§ 371 (c)(1),
(2) Date: Sep. 25, 2015

(87) PCT Pub. No.: WO2014/157566
PCT Pub. Date: Oct. 2, 2014

(65) Prior Publication Data
US 2016/0039642 A1    Feb. 11, 2016

(30) Foreign Application Priority Data
Mar. 27, 2013    (JP) .................. 2013-067067

(51) Int. Cl.
*B66C 9/18*    (2006.01)
*B61H 7/02*    (2006.01)
(Continued)

(52) U.S. Cl.
CPC .................. *B66C 9/18* (2013.01); *B60T 1/14* (2013.01); *B61H 7/04* (2013.01); *F16D 63/008* (2013.01);
(Continued)

(58) Field of Classification Search
CPC .......... F16D 55/14; F16D 55/16; F16D 55/46; F16D 63/008; F16D 2125/66;
(Continued)

(56) References Cited

U.S. PATENT DOCUMENTS 572,939 A * 12/1896 Fairchild .................. B61H 7/02
188/38
660,645 A * 10/1900 Lowe et al. ............. B61H 7/02
188/41
(Continued)

FOREIGN PATENT DOCUMENTS

| EP | 0870724 A2 | 10/1998 |
|---|---|---|
| JP | 63-202589 A | 8/1988 |
| JP | 06-72690 A | 3/1994 |
| JP | 2010-247944 A | 11/2010 |
| JP | 2012-180210 A | 9/2012 |
| JP | 2013-212881 A | 10/2013 |

OTHER PUBLICATIONS

International Search Report dated Jun. Jul. 1, 2014, issued in counterpart application No. PCT/JP2014/058994 (2 pages).

*Primary Examiner* — Thomas J Williams
(74) *Attorney, Agent, or Firm* — Westerman, Hattori, Daniels & Adrian, LLP

(57) ABSTRACT

Provided is a brake device (2) which has reduced manufacturing cost, is compact, and can generate sufficient braking force. Also provided is a crane (1) which comprises the brake device (2). The brake device (2) is installed in a movable body (1) which travels. The brake device (2) is provided with a receiving section (22) affixed to the movable body (1) and is also provided with a brake shoe (21) disposed below the receiving section (21). The brake shoe
(Continued)

(21) has a brake shoe upper surface (24) provided with sloped sections (24u, 24d). The receiving section (22) has a receiving lower surface (26) corresponding to the brake shoe upper surface (24) and provided with sloped sections (26u, 26d). The brake device (2) is configured so that, when the brake device (2) is activated, the brake shoe (21) drops, and the receiving section (22) rides over the brake shoe upper surface (24) when the movable body (1) moves.

4 Claims, 4 Drawing Sheets

(51) Int. Cl.
  *B61H 7/04* (2006.01)
  *B60T 1/14* (2006.01)
  *F16D 63/00* (2006.01)
  *F16D 121/14* (2012.01)
  *F16D 125/66* (2012.01)
(52) U.S. Cl.
  CPC ...... *F16D 2121/14* (2013.01); *F16D 2125/66* (2013.01)
(58) Field of Classification Search
  CPC ......... F16D 2127/10; B66C 9/18; B60T 1/14; B61H 7/02
  USPC .................................................. 188/5, 8, 71
  See application file for complete search history.

(56) References Cited

U.S. PATENT DOCUMENTS

| | | | | |
|---|---|---|---|---|
| 886,997 | A * | 5/1908 | Love | B61H 7/02 188/38 |
| 1,064,519 | A * | 6/1913 | Monroe | B61H 7/02 188/38 |
| 3,217,367 | A * | 11/1965 | Gary | B61H 7/04 188/41 |
| 3,664,464 | A * | 5/1972 | Southard | B60P 7/13 188/168 |
| 3,860,094 | A * | 1/1975 | Breton | B62L 1/005 188/24.14 |
| 6,035,976 | A * | 3/2000 | Duhamel | B60T 1/14 188/5 |
| 2001/0052439 | A1* | 12/2001 | Breitfeld | B60T 7/22 188/33 |
| 2004/0134723 | A1* | 7/2004 | Baumann | F16D 65/18 188/72.2 |
| 2008/0289913 | A1* | 11/2008 | Baumann | F16D 65/095 188/72.2 |
| 2010/0258386 | A1* | 10/2010 | Vollert | F16D 65/18 188/72.2 |
| 2011/0083927 | A1* | 4/2011 | Herges | F16D 65/18 188/72.2 |
| 2011/0127123 | A1* | 6/2011 | Chun | F16D 65/18 188/72.7 |

* cited by examiner

BRAKE DEVICE AND CRANE WITH BRAKE DEVICE

TECHNICAL FIELD

The present invention relates to a brake device, for example, for a crane that travels on a rail, and a crane with the brake device.

BACKGROUND ART

Conventionally, a brake device such as a rail brake has been used to prevent runaway of a quay crane or portal crane during normal loading or under a weather where a sudden gust of wind possibly occurs. A pressing-type brake device (see, for example, Patent Literature 1) and a pinching-type brake device (see, for example, Patent Literature 2) are mainly disclosed as the conventional brake devices.

First, the pressing-type brake device described in Patent Literature 1 will be described. The pressing-type brake device includes plural disc springs stacked with each other, a brake shoe fixed at the lower end portion of the stacked disc springs, and a hydraulic cylinder for compressing the disc springs.

This brake device is configured such that the disc springs are compressed by the hydraulic cylinder so that the brake shoe is not brought into contact with the rail during a normal time, for example, when the crane travels. Furthermore, when the brake device is activated, the disc springs are released, and the brake shoe is pressed against the rail with the restoring force of the disc springs. With this configuration, the brake shoe generates frictional force with the upper surface of the rail, whereby runaway of the crane can be prevented.

However, the pressing-type brake device described above has several problems. The first problem is that the manufacturing cost of the brake device significantly increases to improve the braking force of the brake device. This is because the sizes of the disc springs and the hydraulic cylinder need to be increased to improve the braking force, which leads to an increase in the manufacturing cost.

The second problem is that it is difficult to reduce the size of the brake device. This is because the number of disc springs each having a small deformation amount needs to be increased to ensure the stroke of the brake shoe with respect to the rail. More specifically, the rail warps in the vertical direction by approximately ±10 to 30 mm. For this reason, the brake shoe needs to have a stroke of approximately 40 mm. Here, because the deformation amount per disc spring is approximately 1 to 2 mm, at least 20 to 40 disc springs need to be stacked, which leads to an increase in the size of the brake device.

The third problem is that it is difficult to improve reliability of the brake device. This is because disc springs may crack, which leads to a significant reduction in the braking force. The brake device is repeatedly activated and stopped every time the crane travels and stops, and is frequently used, which increases the possibility of breakage of built-in disc springs.

Next, the pinching-type brake device described in Patent Literature 2 will be described. The pinching-type brake device includes brake shoes configured to pinch the rail from both sides thereof, and a motor having a cam for pressing the brake shoes against the rail. With this configuration, the brake shoes generate frictional force with the side surfaces of the rail, whereby runaway of the crane can be prevented.

However, the pinching-type brake device has several problems. The first problem is that the manufacturing cost of the brake device significantly increases to improve the braking force of the brake device. This is because the size of the motor needs to be increased to improve the braking force, which leads to an increase in the cost of the motor.

The second problem is that there is a possibility that brake does not work in the case where the brake device is activated during runaway of the crane. This is because the main body of the pinching-type brake device may be flicked upward and the rail may not be held as a result of operations of upper and lower position adjusting mechanisms, which are installed in the main body of the brake device.

CITATION LIST

Patent Literature

PTL 1: Japanese Patent Laid-Open No. 2010-247944
PTL 2: Japanese Patent Laid-Open No. 06-72690

SUMMARY OF INVENTION

Technical Problem

The present invention has been made in view of the problems described above, and an object of the present invention is to provide, with regard to a brake device preventing runaway or the like of the crane, a brake device which has reduced manufacturing cost, is compact, and can generate sufficient braking force. Furthermore, another object of the present invention is to provide a crane with the brake device described above.

Solution to Problem

A brake device according to the present invention for achieving the object described above is a brake device installed in a movable body that travels, including:
a receiving section fixed to the movable body; and
a brake shoe disposed below the receiving section, wherein
the brake shoe has a brake shoe upper surface provided with a sloped section,
the receiving section has a receiving lower surface provided with a sloped section corresponding to the brake shoe upper surface, and
the brake shoe is configured so that, when the brake device is activated, the brake shoe drops, and the receiving section rides over the brake shoe upper surface when the movable body moves.

With this configuration, it is possible to significantly improve braking force of the brake device. This is because it is possible to obtain a braking force proportional to the weight of the movable body. Furthermore, it is possible to obtain a brake device having the increased braking force at a reduced cost. This is because the power necessary for the brake device is independent of the braking force. In addition, it is possible to easily reduce the size of the brake device. This is because the large number of disc springs, a large cylinder, and a large motor are not necessary.

The brake device according to the present invention for achieving the object described above is a brake device installed in a movable body that travels on a rail, including:
a receiving section fixed to the movable body; and
a brake shoe disposed below the receiving section, wherein the brake shoe has a brake shoe upper surface provided with a sloped section, the receiving section has a receiving lower surface provided with a sloped section corresponding to the brake shoe upper surface, and the brake shoe is configured so that, when the brake device is activated, the brake shoe drops onto the rail, and the receiving section rides over the brake shoe upper surface when the movable body moves. With this configuration, it is possible to obtain operation and effect similar to those described above.

In the brake device described above, the brake shoe has the brake shoe upper surface provided with an upward sloped section and a downward sloped section in a traveling direction of the movable body, and the receiving section has the receiving lower surface corresponding to the brake shoe upper surface and provided with an upward sloped section and a downward sloped section. With this configuration, it is possible to significantly improve the braking force of the brake device regardless of runaway direction of the movable body.

In the brake device described above, the brake device includes a suspending device from which the brake shoe is suspended, the suspending device has a cylinder fixed on a side of the movable body and configured so as to be able to extend and contract, and a swing arm supported by the cylinder through a swing shaft, and the brake shoe is installed at the other end of the swing arm so as to be able to swing along a traveling direction of the movable body.

With this configuration, it is possible to easily achieve reduction in size of a brake device. In particular, this configuration makes it easy to achieve a design for assuring a stroke of the brake shoe.

A crane according to the present invention for achieving the object described above is a crane configured to move along a rail, the crane including a brake device according to any one of those described above. With this configuration, it is possible to significantly improve the braking force of the crane.

Advantageous Effects of Invention

With the brake device according to the present invention, it is possible to provide a brake device which has reduced manufacturing cost, is compact, and can generate sufficient braking force. Furthermore, it is possible to provide a crane having the brake device described above.

DESCRIPTION OF EMBODIMENTS

Figure 1:
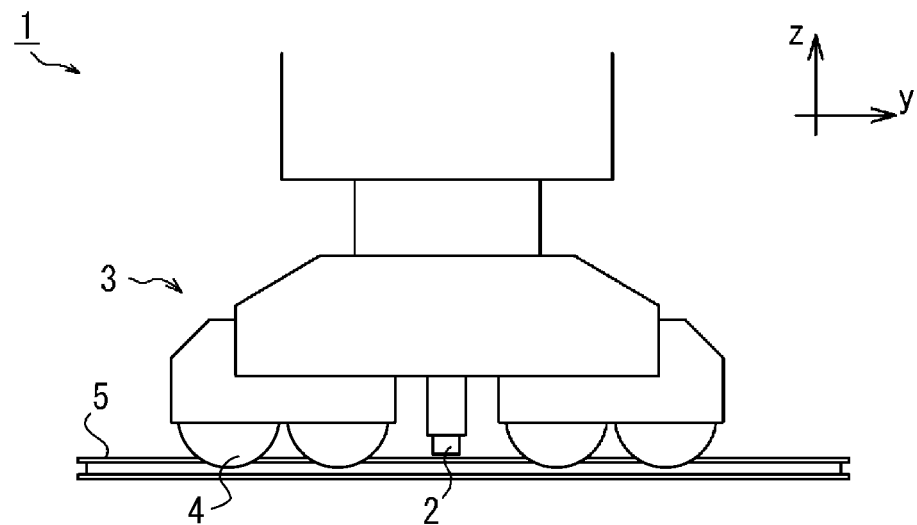
FIG. 1 is a schematic view illustrating a crane with a brake device according to an embodiment of the present invention.

Hereinbelow, a brake device according to an embodiment of the present invention and a crane (movable body) with the brake device will be described with reference to the drawings. FIG. 1 is a schematic view illustrating a crane (movable body) 1 according to an embodiment of the present invention. The crane 1, which is a quay crane, a portal crane or the like, has a traveling device 3. The traveling device 3 includes a brake device 2 installed so as to extend from the central portion of the lower surface of the traveling device 3 toward a rail 5, and wheels 4 that rotate along the rail 5. Here, "y" represents a traveling direction (longitudinal direction of the rail) of the crane 1, and "z" represents the vertical direction.

It should be noted that the position where the brake device 2 is installed is not limited to that described above. The brake device 2 can be installed at any position, provided that the position thereof is located, for example, between the crane 1 and the rail 5 such as on the lower surface of a leg structure constituting the crane 1.

Figure 2:
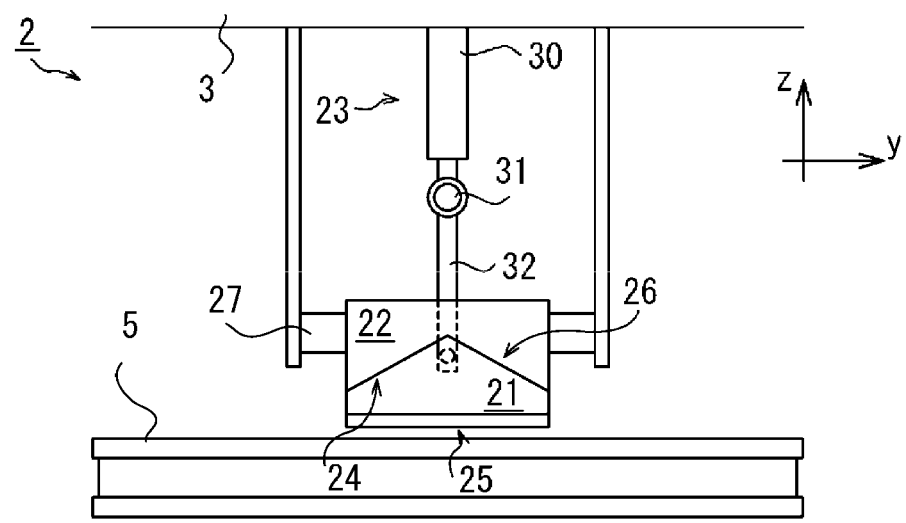
FIG. 2 is a schematic view illustrating the brake device according to the embodiment of the present invention at a normal time.

FIG. 2 schematically illustrates the brake device 2 at a normal time (during traveling). The brake device 2 includes: a receiving section 22 fixed, for example, to the traveling device 3 of the crane (movable body) 1 through a supporting mechanism 27; the brake shoe 21 disposed below the receiving section 22; and a suspending device 23 from which the brake shoe 21 is suspended. The brake shoe 21 has a brake shoe upper surface 24 having a sloped section, and a brake shoe lower surface 25 configured so that the coefficient of friction with respect to the rail 5 is high. The brake shoe upper surface 24 is formed so as to have an upward sloped section and a downward sloped section in the traveling direction (longitudinal direction of the rail 5) y of the crane 1, and is formed, for example, into a convex shape.

Furthermore, the receiving section 22 has a receiving lower surface 26 that corresponds to (is sloped in the same direction as) the brake shoe upper surface 24. This receiving lower surface 26 is formed so as to have an upward sloped section and a downward sloped section in the traveling direction (longitudinal direction of the rail 5) y of the crane 1, and is formed, for example, into a concave shape. Here, the sloped sections of the brake shoe upper surface 24 and the receiving lower surface 26 may have the same angle, or may have different angles.

In addition, the suspending device 23 includes a cylinder 30 fixed on the crane 1 side and configured so as to be able to extend and contract, and a swing arm 32 supported by the cylinder 30 through the swing shaft 31. The brake shoe 21 is suspended from the swing arm 32 so that the brake shoe 21 can swing along the traveling direction (longitudinal direction of the rail 5) y of the crane 1.

Next, operations of the brake device 2 will be described. This brake shoe 21 is suspended with the suspending device 23 such that the brake shoe lower surface 25 is spaced apart from the rail 5 during a normal time, for example, when the crane 1 travels.

Figure 3:
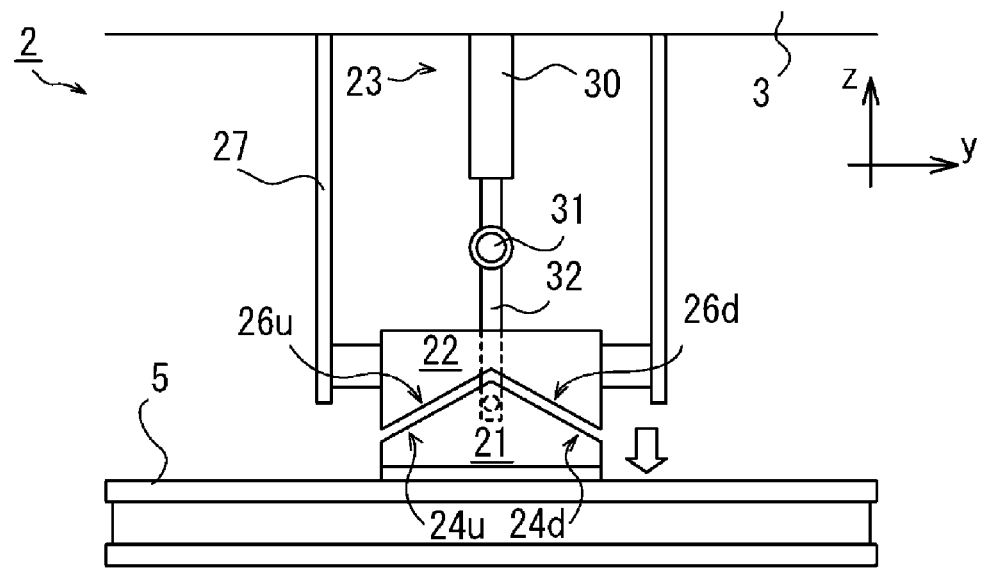
FIG. 3 is a schematic view illustrating the brake device according to the embodiment of the present invention when activation of the brake device is started.

FIG. 3 schematically illustrates the brake device 2 when activation thereof is started. The brake device 2 first releases suspension of the brake shoe 21 with the suspending device 23 to cause the brake shoe 21 to drop on the rail 5 (see the white arrow) when braking is necessary for the crane 1, for example, when a sudden gust of wind occurs during loading with the crane, when the crane runs away due to wind exceeding the capacity of traveling motor or traveling brake of the crane, when the crane is at rest, or during a power outage. Here, "24u" represents an upward sloped section 24u of the brake shoe upper surface 24, and "24d" represents a downward sloped section 24d. Furthermore, "26u" represents an upward sloped section 26u of the receiving lower surface 26, and "26d" represents a downward sloped section 26d.

Figure 4:
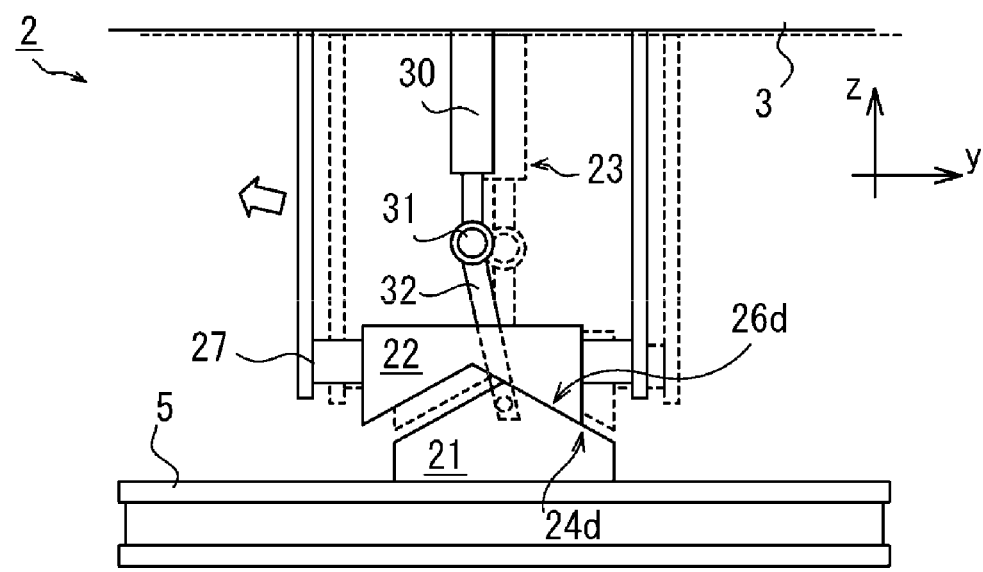
FIG. 4 is a schematic view illustrating the brake device according to the embodiment of the present invention when the brake device is activated.

FIG. 4 schematically illustrates the brake device 2 when activated. In the case where the crane 1 runs away along the rail 5, the receiving section 22 together with the traveling device 3 of the crane 1 moves, for example, in the left direction in FIG. 4. At this time, the brake shoe 21 basically maintains its relative position with respect to the rail 5 due to a tilting movement of the swing arm 32 of the suspending device 23. Furthermore, the downward sloped section 26d of the receiving lower surface 26 rides over the downward sloped section 24d of the brake shoe upper surface 24. In other words, the crane 1 rides over the brake shoe 21, and is brought into a braked state. Here, the state where "receiving lower surface 26 rides over the brake shoe upper surface 24" includes a case where the receiving lower surface 26 rides over the brake shoe upper surface 24 to a degree that the vertical height of the receiving section 22 changes, and also includes a state where the height substantially remains the same and the brake shoe 21 is pressed against the rail 5 by the weight of the crane 1.

For example, in the case where two brake devices 2 are installed in the quay crane 1 with the weight, for example, of 1300 t, the brake shoe 21 is pressed against the rail 5 with the weight of 650 t at most. Thus, the frictional force acting on the brake shoe 21 in the traveling direction y can be obtained by multiplying the coefficient μ of friction between the rail 5 and the brake shoe lower surface 25 by the weight of the crane 1.

It should be noted that the brake shoe upper surface 24 and the receiving lower surface 26 are configured so as to have a reduced coefficient μ of friction. Furthermore, the brake shoe lower surface 25 is configured to have a coefficient μ of friction larger than that of the brake shoe upper surface 24 or the receiving lower surface 26.

In addition, in the case where the crane 1 runs away in the right direction in FIG. 4, the upward sloped section 26u of the receiving lower surface 26 rides over the upward sloped section 24u of the brake shoe upper surface 24 to brake the crane 1 (see FIGS. 3 and 4).

Next, operations of the brake device 2 when recovered will be described. At the time of recovery, the engagement state of the brake shoe 21 and the receiving section 22 is released, and the brake shoe 21 is suspended with the suspending device 23 to complete the recovery operation. The specific method of releasing the engagement state includes the one described below.

The first method first causes the crane 1 to travel in a direction of releasing the engagement of the brake shoe 21 and the receiving section 22. Then, the brake shoe 21 is raised to release the contact with the rail 5.

The second method first releases fixing of the receiving section 22 fixed to the crane 1. In this case, it is possible to employ, for example, a method of moving upward the receiving section 22, a method of moving the receiving section 22 in a direction perpendicular to the traveling direction (longitudinal direction of the rail 5) y of the crane 1, or a method of moving the receiving section 22 along the traveling direction y and in a direction of releasing the engagement state thereof. Then, the receiving section 22 is fixed to the crane 1 again while the brake shoe 21 is being raised.

The third method first jacks up the crane 1 itself and pulls out the brake shoe 21 from between the receiving section 22 and the rail 5. Then, the method raises the brake shoe 21, and releases the jack-up of the crane 1.

The fourth method first supplies lubricant, for example, from a lubricant supplying device set in advance at the receiving section 22, to a contacting surface between the receiving lower surface 26 and the brake shoe upper surface 24. Then, the suspending device 23 generates force in a direction (vertically upward) of suspending the brake shoe 21 to pull out the brake shoe 21.

Figure 5:
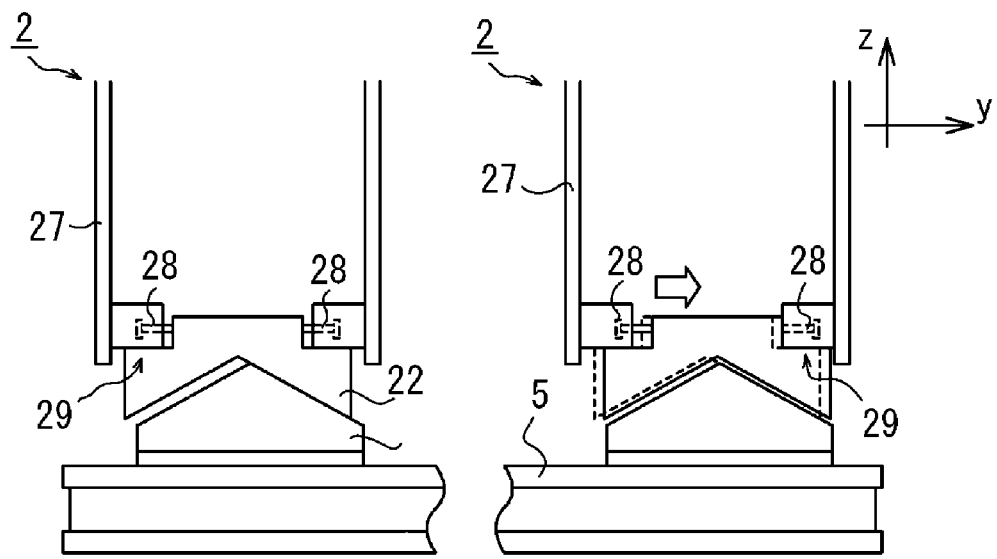
FIG. 5 is a schematic view illustrating the brake device according to the embodiment of the present invention when the brake device is recovered.

The fifth method moves the receiving section 22 with a push bolt 28 installed in the supporting mechanism 27 in advance as illustrated in FIG. 5. For example, when the push bolt 28 on the left side in FIG. 5 is pushed out, and the push bolt on the right side is pulled in, the receiving section 22 moves toward the right side in FIG. 5 to allow release of the engagement state with the brake shoe 21. Note that the vertical load generated in the receiving section 22 is supported by a shoulder portion 29 formed on the receiving section 22.

The method of releasing the engagement state is not limited to those described above. It is only necessary to employ a configuration in which the load of the crane 1 generated between the brake shoe 21 and the receiving section 22 is released, and the brake shoe 21 is removed.

With the configuration described above, the crane 1 can achieve the following operations and effects. Firstly, it is possible to significantly improve the braking force of the brake device 2. This is because it is possible to significantly increase the force that presses the brake shoe 21 against the rail 5 in proportion to the weight of the crane 1.

Secondly, it is possible for the brake device to have high braking force at a reduced cost. This is because the power required for the brake device 2 is almost equivalent to that for the suspending device 23 supporting the weight of the brake shoe 21. For example, when a conventional brake device tries to have a power equivalent to that of the brake device 2 according to the present invention, disc springs need to press the brake shoe against the rail with a power equivalent to the self-weight of the crane, and thus the cylinder capable of compressing such disc springs is increased in size and cost.

Thirdly, it is possible to easily reduce the size of the brake device 2. This is because a large number of disc springs, a large cylinder, a large motor etc. are not necessary. In particular, it is possible to assure the stroke of the brake shoe 21 only by adjusting the sizes of the brake shoe 21 and the receiving section 22 in the vertical direction z, or the stroke of the suspending device 23.

Fourthly, it is possible to improve the reliability of the brake device 2. This is because it is not necessary for the brake device 2 to use members likely to be broken, such as disc springs. This brake device 2 can exhibit sufficient functions unless the brake shoe 21 and the receiving section 22 are broken. Furthermore, the braking force of the brake device 2 does not decrease according to the amount of wear of the brake shoe lower surface 25. In addition, the brake device 2, even when activated during runaway of the crane, generates a sufficient braking force to stop runaway of the crane.

It should be noted that it is desirable to configure the suspending device 23 so as to extend as hydraulic pressure of the cylinder 30 is released. More specifically, it is desirable to employ a configuration in which the suspending device 23 is released as a hydraulic valve in the cylinder 30 is released. This is because, for example, even in the case where a sudden gust of wind and a power outage occur at the same time, this configuration allows the hydraulic valve to be released at the time of the power outage, so that the brake device 2 can reliably operate.

Furthermore, it is desirable to configure the receiving lower surface 26 so as to have a sloped section having the same angle as that of the brake shoe upper surface 24. This is because, when the brake shoe 21 is suspended with the suspending device 23, the brake shoe upper surface 24 and the receiving lower surface 26 are brought into close contact with each other, and it is possible to retain, for example, lubricant between them. With this configuration, the receiving section 22 can smoothly ride over the brake shoe 21 when the brake device is activated.

Furthermore, it is desirable to install at least one brake device 2 on each of the sea side and the land side of the traveling device (or a leg structure or the like). However, the number of brake devices 2 installed can be arbitrarily determined according to the size of the crane 1 or the required braking force.

Figure 6:
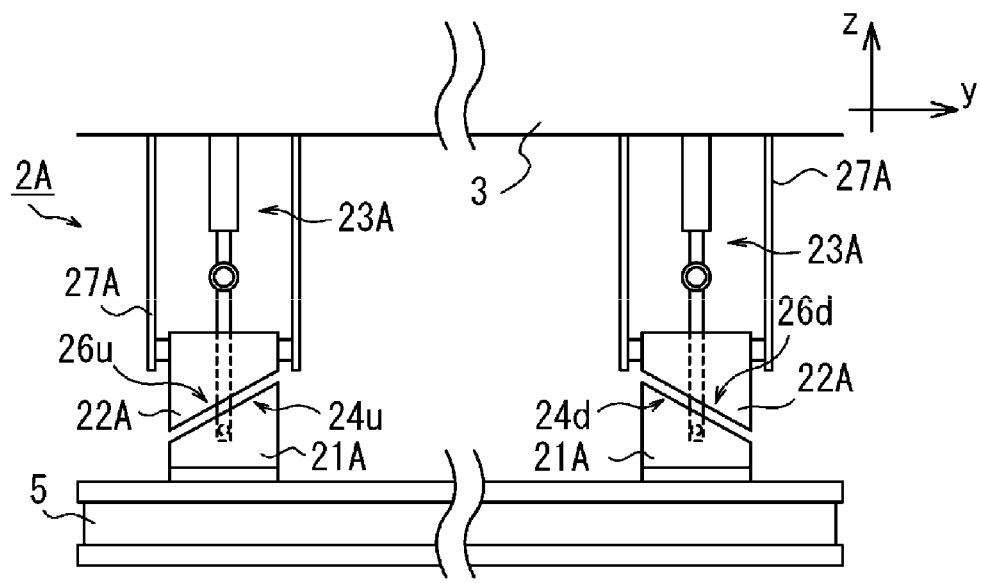
FIG. 6 is a schematic view illustrating a brake device according to another embodiment of the present invention.

FIG. 6 schematically illustrates a brake device 2A according to another embodiment of the present invention when activation thereof is started. In this brake device 2A, the brake shoe and the receiving section are each separated into two portions according to the direction of the sloped section. More specifically, a brake device on one side has a brake shoe 21A having an upward sloped section 24$u$ and a receiving section 22A having an upward sloped section 26$u$, whereas a brake device on the other side has a brake shoe 21A having a downward sloped section 24$d$ and a receiving section 22A having a downward sloped section 26$d$.

Figure 7:
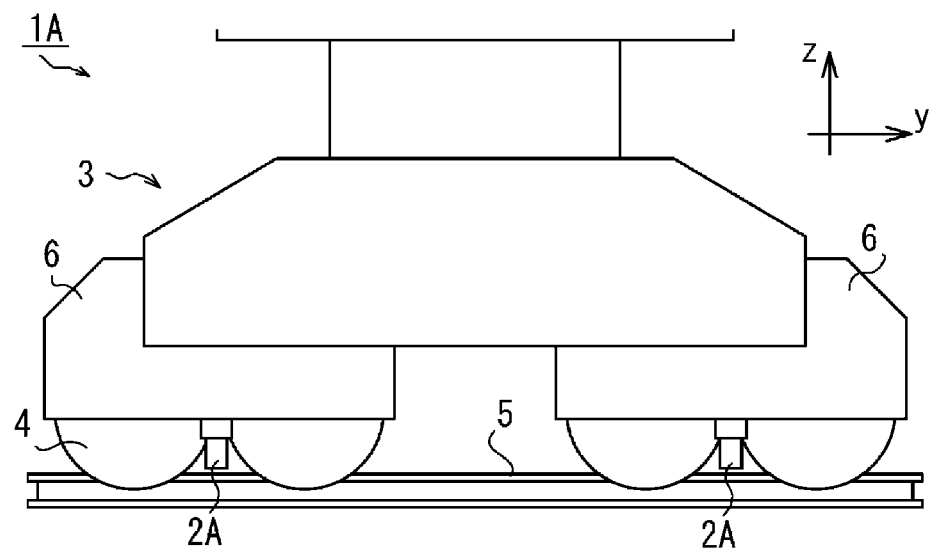
FIG. 7 is a schematic view illustrating a crane with the brake device according to the another embodiment of the present invention.

With this configuration, it is possible to reduce the size of each of the brake devices 2A, which makes it possible to increase a degree of freedom in placement in, for example, the crane 1A. More specifically, as illustrated in FIG. 7, the brake device 2A can be provided in each of plural bogies 6 of the traveling device 3. The reduction in the size of the brake device 2A brings an advantage particularly in the case where the brake device 2A is installed in, for example, a portal crane having a size smaller than that of the quay crane.

Figure 8:
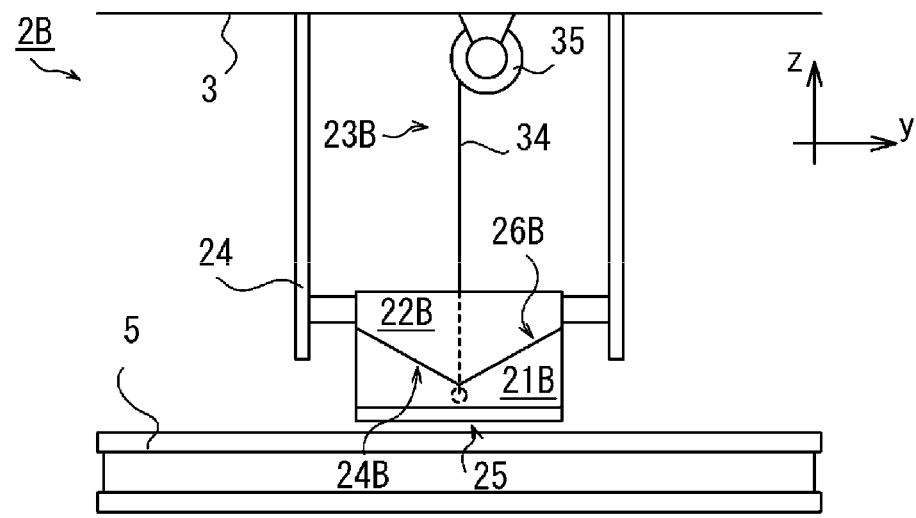
FIG. 8 is a schematic view illustrating a brake device according to yet another embodiment of the present invention at a normal time.

FIG. 8 schematically illustrates a brake device 2B according to yet another embodiment of the present invention at a normal time. A suspending device 23B of this brake device 2B includes a drum 35 fixed on the crane side, and a wire 34 wound around the drum 35 and having one end connected with the brake shoe 21B. Furthermore, a brake shoe upper surface 24B is formed into a concave shape having a downward sloped section and an upward sloped section in the traveling direction (longitudinal direction of the rail 5) y of the crane 1. Furthermore, a receiving lower surface 26B is formed into a convex shape having a downward sloped section and an upward sloped section in the traveling direction y.

Next, operations of this brake device 2B will be described. The suspending device 23B of this brake device 2B releases the clutch of the drum 35 when activation of the brake device is started to cause the brake shoe 21B to drop on the rail 5 due to its own weight. In the case where the crane runs away, the receiving section 22B rides over the brake shoe 21B to brake the crane. Furthermore, at the time of recovery, the engagement state of the brake shoe 21B with the receiving section 22B is released, for example, through the method of releasing the engagement state described above, the wire 34 is wound with the drum 35, and the brake shoe 21B is suspended again to complete the operation.

In addition to the operation and effect similar to those described above, the configuration described above can firstly achieve reduction in size and weight of the brake device 2B. This is because this configuration employs the wire 34 in place of the structure such as the swing arm 32.

Secondly, as the wire 34 is employed, even in the case where the receiving section 22B largely moves in the left-right direction in FIG. 8 with respect to the brake shoe 21B, it is possible to prevent occurrence of a situation where the brake shoe 21B is pulled by the suspending device 23B, and is moved. This is because this can be dealt with by unwinding the wire 34. In particular, this advantage becomes significant in the case where the angle of each of the sloped sections is configured so as to be gentle so that the braking force of the brake device gradually increases.

It should be noted that it is desirable that the sloped sections of the brake shoe 21, 21A, 21B and the receiving section 22, 22A, 22B are configured such that the receiving section 22 rides over the brake shoe 21 even in the case where the movable body such as a crane runs away in any direction. Furthermore, the configuration of the sloped section of each of the brake shoe upper surface 24 and the receiving lower surface 26 is not limited to a flat slope. The sloped section may be formed into, for example, a curved surface, provided that the receiving section 22 is configured to ride over the brake shoe 21. In addition, it may be possible to employ a configuration in which either one of the brake shoe and the receiving section is formed into a truncated cone having a convex shape, and the other one is formed into a concave shape corresponding to the truncated cone; and the braking force is generated not only in the traveling direction of the crane but also in other directions such as in the transverse direction. The brake device having this configuration brings an advantage particularly in the case where the brake device is installed, for example, in a portal crane that revolves, for example, a traveling device to change the traveling direction. Moreover, it is desirable that the suspending device 23B described above is also configured such that the brake shoe 21B drops on the rail 5 at the time of a power outage. More specifically, it is possible to employ a configuration in which, at a normal time, a motor or the like installed in the drum 35 is energized to lock the rotation to suspend the brake shoe 21B; and at the time of a power outage, the brake shoe 21B drops by its own weight.

These are descriptions of the brake device and the crane with the brake device according to the present invention. However, this brake device can also be used in a movable body other than the crane that travels on a rail. For example, this brake device can be used, for example, in a train that travels on a rail. In particular, the brake shoe and the receiving section may only have either the upward sloped section or the downward sloped section, in the case where this brake device is used to prevent runaway only in one direction, for example, in the case where the brake device is employed, for example, in a train.

Furthermore, the brake device may be used in a portal crane having traveling tires such as rubber tires, a trailer, or the like. In such a case, the brake shoe causes friction with the road surface or ground surface, rather than with a rail. In the case where the brake device is used in these movable bodies, the brake device can be used as a substitution for a wheel lock, in addition to anti-runaway when a sudden gust of wind occurs.

REFERENCE SIGNS LIST 1, 1A crane
2, 2A, 2B brake device
5 rail
21 brake shoe
22 receiving section
23, 23A, 23B suspending device
24 brake shoe upper surface
24u upward sloped section
24d downward sloped section
25 brake shoe lower surface
26 receiving lower surface
26u upward sloped section
26d downward sloped section
30 cylinder
31 swing shaft
32 swing arm

The invention claimed is:

1. A brake device installed in a movable body that travels, comprising:
a supporting mechanism,
a receiving section fixed to the movable body through the supporting mechanism;
a suspending device, and
a brake shoe suspended from the suspending device and disposed below the receiving section, wherein:
the brake shoe has a brake shoe upper surface provided with a sloped section,
the receiving section has a receiving lower surface provided with a sloped section corresponding to the brake shoe upper surface,
the brake shoe is configured so that, when the brake device is activated, the brake shoe drops, the receiving section rides over the brake shoe upper surface when the movable body moves, and there is a vertical space between the brake shoe upper surface and the receiving lower surface of the receiving section, and
the suspending device includes a drum fixed on a side of the movable body, and a wire wound around the drum, the wire having an end connected with the brake shoe.

2. A brake device installed in a movable body that travels, comprising:
a supporting mechanism having a push bolt;
a suspending device;
a receiving section fixed to the movable body through the supporting mechanism, the receiving section having a shoulder portion which supports a vertical load generated between the receiving section and the supporting mechanism, the receiving section being moved along a traveling direction y of the movable body by the push bolt of the supporting mechanism; and
a brake shoe suspended from the suspending device and disposed below the receiving section;
wherein:
the brake shoe has a brake shoe upper surface provided with a sloped section,
the receiving section has a receiving lower surface provided with a sloped section corresponding to the brake shoe upper surface, and
the brake shoe is configured so that, when the brake device is activated, the brake shoe drops, the receiving section rides over the brake shoe upper surface when the movable body moves, and there is a vertical space between the brake shoe upper surface and the receiving lower surface of the receiving section; and
the brake shoe and the receiving section have an engagement state, and the brake device is configured so that when the engagement state of the brake shoe and the receiving section is released, the shoulder portion supports the vertical load and at the same time, the push bolt moves the receiving section along the traveling direction y.

3. A brake device installed in a movable body that travels on a rail, comprising:
a supporting mechanism,
a receiving section fixed to the movable body through the supporting mechanism;
a suspending device, and
a brake shoe suspended from the suspending device and disposed below the receiving section,
wherein:
the brake shoe has a brake shoe upper surface provided with a sloped section,
the receiving section has a receiving lower surface provided with a sloped section corresponding to the brake shoe upper surface,
the brake shoe is configured so that, when the brake device is activated, the brake shoe drops onto the rail, the receiving section rides over the brake shoe upper surface when the movable body moves, and there is a vertical space between the brake shoe upper surface and the receiving lower surface of the receiving section, and
the suspending device includes a drum fixed on a side of the movable body, and a wire wound around the drum, the wire having an end connected with the brake shoe.

4. A brake device installed in a movable body that travels on a rail, comprising:
a supporting mechanism having a push bolt;
a receiving section fixed to the movable body through the supporting mechanism, the receiving section having a shoulder portion which supports a vertical load generated between the receiving section and the supporting mechanism, the receiving section being moved along a traveling direction y of the movable body by the push bolt of the supporting mechanism;
a suspending device, and
a brake shoe suspended from the suspending device and disposed below the receiving section,
wherein:
the brake shoe has a brake shoe upper surface provided with a sloped section,
the receiving section has a receiving lower surface provided with a sloped section corresponding to the brake shoe upper surface,
the brake shoe is configured so that, when the brake device is activated, the brake shoe drops onto the rail, the receiving section rides over the brake shoe upper surface when the movable body moves, and there is a vertical space between the brake shoe upper surface and the receiving lower surface of the receiving section, and
the brake shoe and the receiving section have an engagement state, and the brake device is configured so that when the engagement state of the brake shoe and the receiving section is released, the shoulder portion supports the vertical load and at the same time, the push bolt moves the receiving section along the traveling direction y.

* * * * *